Patented Aug. 5, 1941

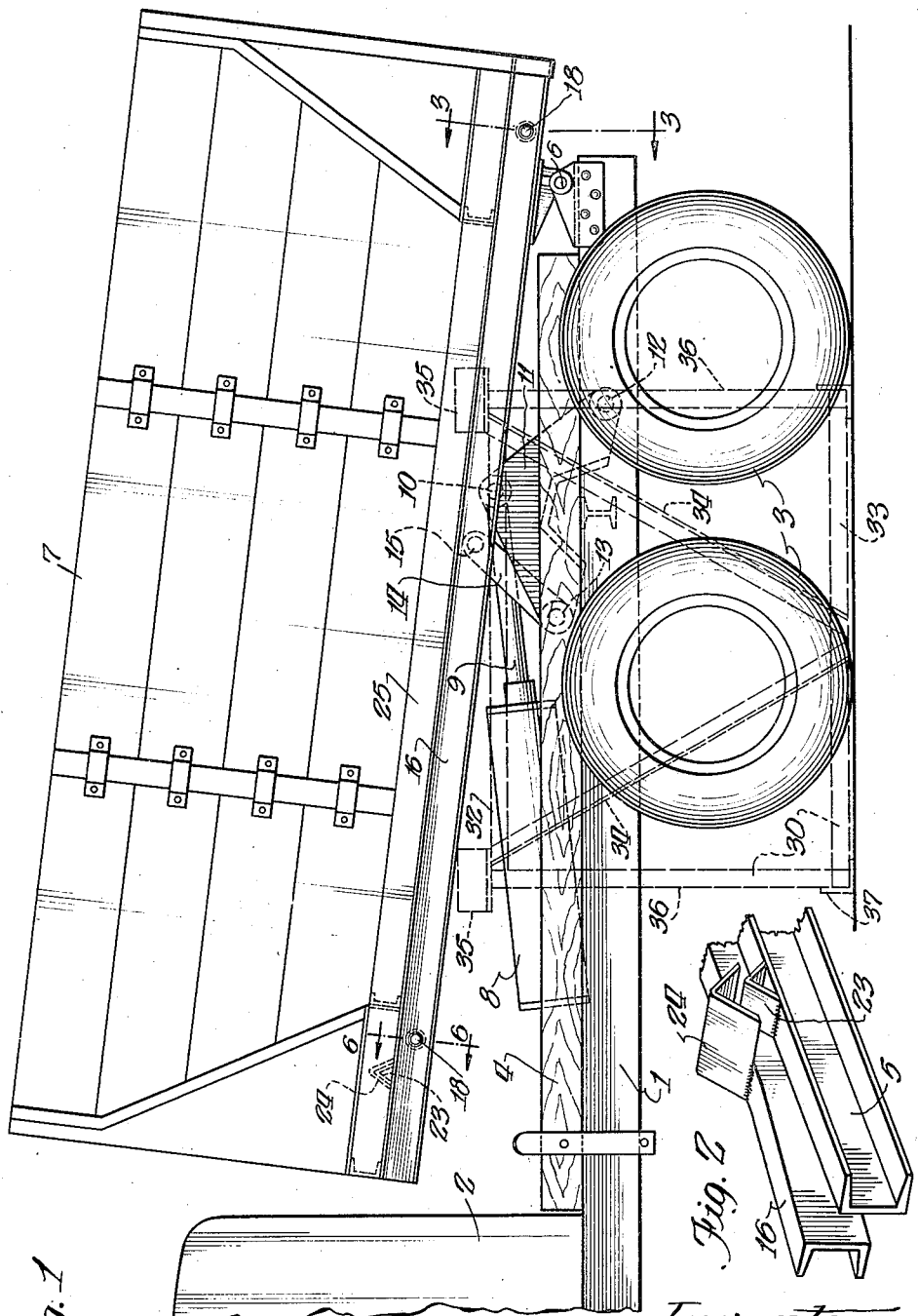

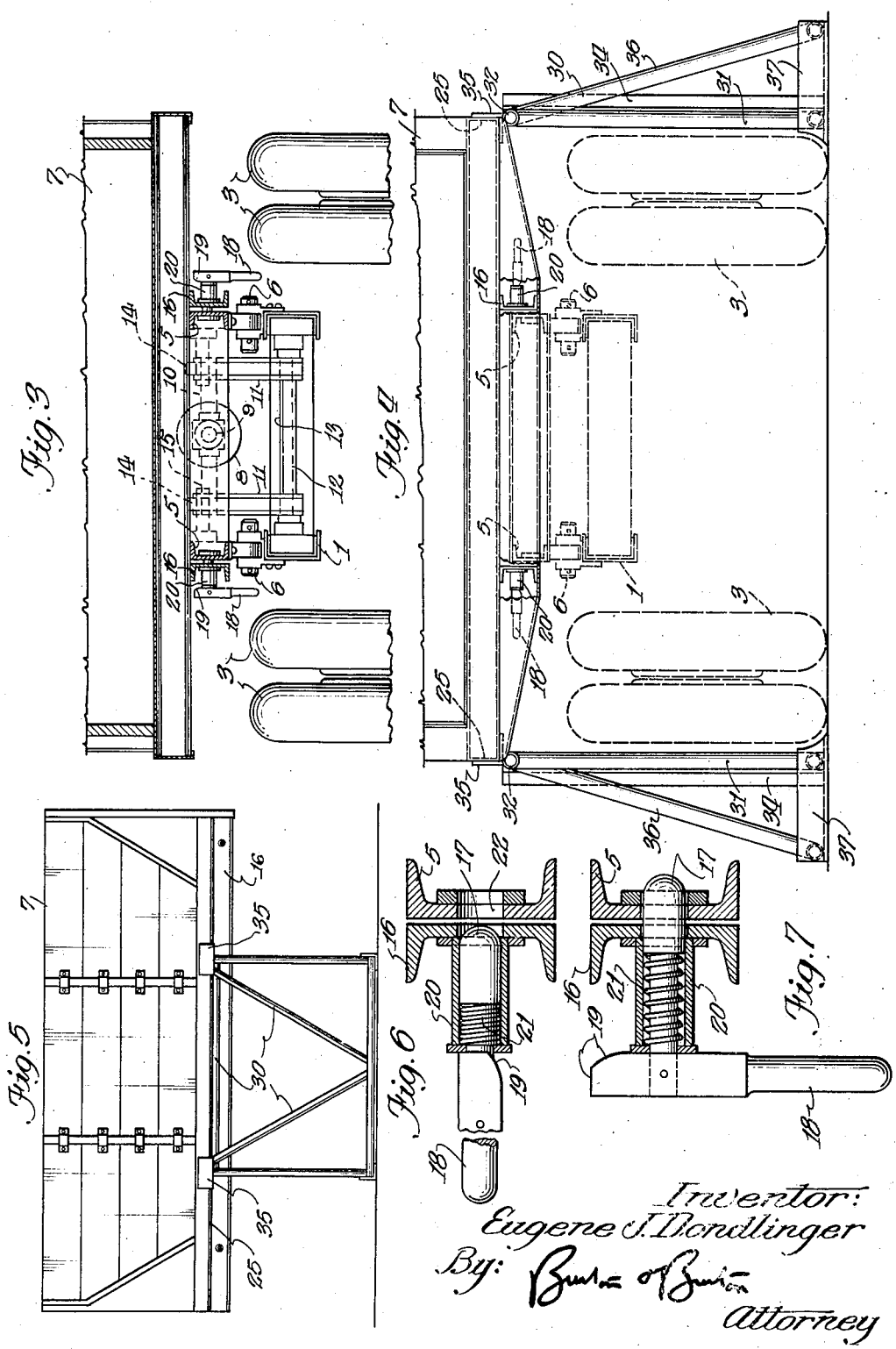

2,251,839

UNITED STATES PATENT OFFICE 2,251,839

REMOVABLE TRUCK BODY

Eugene J. Dondlinger, Chicago, Ill.

Application April 29, 1940, Serial No. 332,128

8 Claims. (Cl. 254—45)

This invention relates to a vehicle body removably mounted on its running gear, and the drawings illustrate the running gear as that of a motor vehicle and the body as of a type designed for hauling coal, brick, crushed stone, tile or the like.

One object of the invention is to provide a load-carrying body which may be disconnected from the truck frame and supported independently thereof while it is being loaded or unloaded.

Another object is to provide simple and economical independent supporting means for this purpose.

A further object is to provide a removable body in combination with a truck having a hoisting mechanism, and to utilize the hoist in the processes of separating and reconnecting the body and the truck.

It is also an object of the invention to provide a removable body for a motor truck requiring a minimum addition of mechanism or other parts to adapt the body for simple and rapid detachment from the truck frame, or replacement thereon.

The invention consists in certain features and elements of construction in combination, as herein shown and described and as indicated by the claims.

In the drawings:

Figure 1 is a side elevation showing a body and the rear portion of a motor vehicle to which this invention is applied, the representation of the motor truck being somewhat diagrammatic.

Figure 2 is a detail perspective view illustrating inter-engaging connections between the truck frame and the body.

Figure 3 is a transverse section taken substantially as indicated at line 3—3 on Figure 1.

Figure 4 is a rear elevation of the body showing in full lines the body carried on independent supporting means and showing in dotted outline the relative position of the truck frame after detachment from the body and before the truck is driven away.

Figure 5 is a side elevation showing the body carried on independent supporting means with the truck entirely removed therefrom.

Figure 6 is a detail section taken as indicated at line 6—6 on Figure 1, showing a connecting bolt for interlocking the truck and body frames but illustrating the bolt in withdrawn or unlocked position.

Figure 7 is a section similar to Figure 6, showing the bolt in locking position.

In many types of hauling, particularly in connection with construction work, it is convenient and economical to provide a motor truck unit with two or more interchangeable bodies which may be independently supported during loading or unloading operations, or both. Thus, for example, while the body stands in a brickyard being loaded, the truck unit may be hauling an already loaded body to the site of construction work and returning to pick up a loaded body and leave an empty body; as a result, the truck is kept in practically continuous service instead of idle, during the loading operation. In some cases the unloading may be accomplished readily by simply tilting the body and dumping the contents; and when this is possible there would be no advantage in disconnecting the body from the truck for the unloading operation.

The drawings show the rear portion of a motor truck, including a side frame member 1, a fragment of the driver's cab at 2 and rear drive wheels 3. The frame members 1 are surmounted by sills 4, and normally a pair of longitudinal rails 5 rest on these sills 4 and are connected to the frame members 1 at the rear end of the truck my means of hinge pivots 6. This arrangement is provided primarily to permit tilting the body 7 to a dumping angle by means of any suitable hoisting mechanism, such as the hydraulic cylinder 8, having a piston rod 9 connected at 10 to a lever 11. This lever is fulcrumed on the truck frame at 12, and is pivotally connected at 13 to a link 14 extending into connection with the rails 5 at 15.

By means of conventional control mechanism, not shown, the hydraulic hoist is operated to tilt the body 7 to a limited angle, as illustrated in Figure 1, as a step in the process of disconnecting the body from the truck. In positions just outside the rails 5, 5, which are hinged to the truck frame at 6, 6, the body itself is equipped with longitudinal rails 16, 16 which are normally locked to the rails 5, 5 by means of bolts 17. Figure 1 shows one of these bolts near the forward end and one near the rear end of the body. In preparing for disconnection of the body from the truck these bolts 17 are first withdrawn. As shown in Figures 6 and 7, each bolt is equipped with a pivoted handle 18 having a cam portion 19 which reacts against the end of a socket 20 in which the bolt is guided, and which encloses a compression spring 21, urging the bolt into locking position, as seen in Figure 7. Swinging the handle 18 about its pivot to the position shown in Figure 6 withdraws the bolt from the reinforced opening 22 with which it interlocks in the member 5. Since the rails 16 and the rails 5 are all substantially parallel, this would free the body for sliding movement along the rails 5, except that a temporary interlocking expedient is provided in the form of a V-shaped projection 23, secured to the upper surface of each of the rails 5 and engaging in a downwardly open V-shaped socket member 24 secured to the upper edge of each rail 16 and extending laterally so as to overhang the projection 23. Thus, if the rails 5 are displaced vertically from the rails 16, the interlocking parts 23 and 24 will be disengaged, but until this occurs the inter-engagement of the parts 23 and 24 will prevent the body from sliding longitudinally along the rails 5, 5, even when it is tilted to inclined position and the bolts 17 have been withdrawn.

With the body raised at an angle, as shown in Figure 1, temporary supporting frames 30, indicated in dotted outline in Figure 1, are placed in position to receive and sustain the body 7 independently of the truck chassis when the body is lowered into horizontal position. Each of the frames 30 comprises upright posts 31 tied together at top and bottom by horizontal members 32 and 33 and braced by diagonals 34. At their upper ends the posts carry angular seats 35, and when the body has been tilted the frames 30 are placed in position at both sides of the truck just outside the wheels so that as the body is lowered its outside sills 25 will come to rest on the seats 35.

The seats 35 are slightly higher from the ground than the normal position of the sills 25 when the body is supported on the truck; thus, as the hoist lowers the rails 5, 5, back to their normal position upon the wooden sills 4, 4, said rails 5, 5 withdraw downwardly from the rails 16, 16 which are secured to the body and are thus held above their normal level by lodgement of the side sills 25 upon the seats 35. The supporting frames 30 include outwardly inclined brace members 36 tied to the posts 31 by short horizontal foot portions 37, so that when the body rests upon the seats 35 and the foot portions 37 rest upon a substantially level surface such as a concrete floor or roadway, the braced construction of the supporting frames 30 prevents lateral weaving of said frames with respect to the body. The truck being now entirely disconnected from the body, may be driven forward in alignment with the members 16, 16 until the members 5 have been withdrawn longitudinally and the truck is entirely clear of the body, leaving it supported, as shown in Figure 5, and ready to receive a load. When the loading is completed, and the truck has returned, it may be backed into position with the rails 5, 5 disposed between the rails 16, 16. Then, by means of the hoist, the rails 5 will be tilted until their upstanding projections 23 interengage with the downwardly open angular sockets 24, and the rails 5 assume the weight of the body so as to lift it off the supports 30. These supporting frames 30 will then be removed and the body lowered into level position on the truck chassis. At the same time, the bolts 17 will be released and allowed to resume their locking positions, as illustrated in Figure 7, thus positively inter-engaging the rails 16 with the rails 5 and securing the body rigidly to the truck. To facilitate backing the truck into position with the rails 5, 5 disposed between the rails 16, 16, the forward ends of the latter may be slightly flared, as indicated in Figure 2, forming converging guide portions between which the rails 5, 5, will be directed into their final positions.

Thus, when my invention is applied to a truck of the type already equipped with a hoist and hinged hoisting rails 5, 5 for use with a rear dumping body, it requires only very slight additions to this structure to adapt it for use in the manner herein described, so that one truck unit may serve two or more detachable bodies for efficient hauling service. While there is shown and described herein certain specific structure embodying the invention, it will be manifest to those skilled in the art that various modifications and re-arrangements of the parts may be made without departing from the spirit and scope of the invention, and that the same is not limited to the particular form herein shown and described, except in so far as indicated by the appended claims.

I claim as my invention:

1. In combination with a vehicle frame and its supporting wheels, a dump body supported on the frame, hoisting mechanism on the frame operable to tilt the body for dumping action, means detachably connecting the body to said hoisting mechanism, and supplemental supporting means disposable under the body when tilted, said supplemental means being dimensioned to support said body clear of the wheels when it is lowered by the hoisting means and detached therefrom, thus permitting the frame to be withdrawn.

2. In combination with a vehicle frame and its supporting wheels, a pair of longitudinal rails hingedly attached to the rear of the frame, a body detachably mounted on said rails, hoisting mechanism on the frame engaged with said rails and operable to swing them upwardly about their hinged connection for lifting the body in relation to said frame, and supplemental supporting means disposable under the body when thus lifted, and dimensioned to support it clear of the wheels when said rails are lowered to their normal position and detached from the body, thus permitting the vehicle frame to be withdrawn.

3. In combination with a vehicle frame and its supporting wheels, hoisting means on the frame including a pair of longitudinal rails, a body normally resting on said rails with means detachably connecting said body to the rails including vertically separable elements, and supplemental supporting means fitting under the body when it is elevated on the rails by the hoisting means, said supplemental means being dimensioned to assume support of the body at a level above that at which it is normally carried by said rails whereby lowering the rails to normal position disconnects said vertically separable elements, permitting the frame to be withdrawn horizontally from under the body.

4. In combination with a vehicle frame and its supporting wheels, a pair of longitudinal rails hingedly attached to the rear of the frame, a body resting on said rails, means detachably connecting said body to the rails including vertically separable elements, and hoisting mechanism on the frame connected to said rails for swinging them upward about their hinged connection, together with portable supporting means disposable under the body when thus elevated and dimensioned to support it clear of the wheels and independently thereof at a level above that at which it is normally carried by said rails, whereby lowering the rails to their normal position disengages said vertically separable elements, permitting the frame to be withdrawn horizontally from under the body.

5. In combination with a vehicle frame and its supporting wheels, a pair of longitudinal rails hingedly attached to the rear of the frame, a body resting on said rails, means detachably connecting said body to the rails including vertically separable elements and horizontally shiftable locking bolts, and hoisting mechanism on the frame connected to said rails for swinging them upward about their hinged connection, together with supplemental supporting means disposable under the body when thus elevated and dimensioned to support it clear of the wheels at a level above that at which it is normally carried by said rails, whereby withdrawing said locking bolts and lowering the rails to their normal position disengages said vertically separable elements, permitting the frame to be withdrawn horizontally from under the body.

6. In combination with a vehicle frame and its supporting wheels, a pair of longitudinal rails hingedly attached to the rear of the frame, a body resting on said rails, a second pair of rails extending respectively adjacent the rails of the first pair and attached to the body, locking means carried by said second pair of rails engageable with the first pair, hoisting mechanism on the frame connected to the first pair of rails for swinging them upward about their hinged connection to the frame and tilting the body to an elevated position, one pair of rails having vertically projecting means and the other pair having cooperating recessed means separable by relative vertical movement of the rails but serving to prevent longitudinal displacement of the second pair of rails with respect to the first when the body is tilted and the said locking means is released, together with supplemental supporting means disposable under the body when thus elevated and dimensioned to support it clear of the wheels when the hoisting means is lowered.

7. Supplemental supporting means for parking a vehicle body separated from its running gear, said means comprising a pair of portable standards separate from each other and each composed of vertical posts with frame members connecting and bracing them in upright position, seating means surmounting said posts all at the same level and formed to receive the vehicle body in horizontal position, laterally extending foot-pieces at the lower ends of the posts and outwardly inclined bracing members connecting the posts to said foot-pieces, whereby said standards may be shifted toward the body from the opposite sides thereof and may be placed laterally adjacent a vehicle at its opposite sides respectively with their bracing members extending laterally away from the vehicle, affording clearance between said standards for withdrawing the vehicle running gear when the body of the vehicle is lowered onto the seating means of the standards.

8. The method of parking a vehicle body in detached relation to its running gear which consists in tilting the body about a transverse axis near one end thereof so that the major portion of said body is elevated at inclined position above its running gear, unlocking the body from the running gear, placing separate supporting means laterally clear of the wheels of the running gear with body receiving parts in position under the elevated body, then lowering the body onto said supporting means, thereby transferring the support of the body from the running gear to said supporting means and finally withdrawing the running gear from under the body.

EUGENE J. DONDLINGER.